UNITED STATES PATENT OFFICE.

WILLIAM NYCE, OF THREE RIVERS, MICHIGAN, ASSIGNOR TO GEORGE NYCE, OF SAME PLACE.

IMPROVED SOAP.

Specification forming part of Letters Patent No. 51,119, dated November 21, 1865.

*To all whom it may concern:*

Be it known that I, WILLIAM NYCE, of Three Rivers, in the county of St. Joseph and State of Michigan, have discovered a new and Improved Mode of Making Erasive and Medicated Soap, for the removal of grease, tar, paint, and all other stains from cloths, dress-goods, and all articles of clothing, and also for the prevention and removal of tan, freckles, and sunburn, and for the prevention and cure of salt-rheum; and I do hereby declare that the following is a full and exact description of the materials used, and of the manner of manufacturing the same.

The ingredients used and the proportions in which they are taken are as follows:

Nitrate potassa, one ounce; spirits-ammonia, one ounce; alkanet-root, one ounce; alcohol, one-half pint; oil-sassafras, twenty drops; oil-citronella, one dram; benzine, two ounces; castile-soap, three pounds; common bar-soap, five pounds; soft water, three and one-half quarts.

The manner of manufacturing is as follows: Dissolve the nitrate potassa in one pint soft water, and dissolve or cut the alkanet-root in the alcohol. Then put three quarts soft water into a copper or brass kettle, and heat over a slow fire. While the water is thus heating shave up finely the castile and common soap. Put this soap into the heated water, and stir it well for twenty minutes, taking care not to let it boil. When the nitrate potassa is dissolved add thereto the spirits ammonia, and then add it to the above mixture, stirring it for a couple of minutes. Then strain the solution of alkanet-root, and add to the above. Take off the fire, and when sufficiently cool add the benzine, stirring well; after which add also the oil-sassafras and oil-citronella. While still warm run into molds of any desirable size and shape.

What I claim as my discovery, and desire to secure by Letters Patent, is—

The combination of the above-named materials, in the proportions and manner herein described, for the manufacture of an erasive and medicated soap, for the uses and purposes herein named.

WM. NYCE.

Witnesses:
L. N. STRAW, Jr.,
J. W. BARNHART.